United States Patent [19]
Albert

[11] 3,885,443
[45] May 27, 1975

[54] FLOATED GYRO WITH ANGULAR INERTIA COMPENSATION

[75] Inventor: William C. Albert, Boonton, N.J.

[73] Assignee: The Singer Company, Little Falls, N.J.

[22] Filed: May 24, 1973

[21] Appl. No.: 363,428

[52] U.S. Cl............. 74/5 R; 73/DIG. 10; 244/1 SA
[51] Int. Cl............................................. G01c 19/20
[58] Field of Search ........ 74/5 R, 55; 244/1 SA, 79; 73/DIG. 10 X

[56] References Cited
UNITED STATES PATENTS

| | | | |
|---|---|---|---|
| 2,913,907 | 11/1959 | Sedgfield | 74/5 R |
| 3,252,339 | 5/1966 | Huang | 74/5 R |
| 3,657,931 | 4/1972 | Jacobson | 74/5 R |
| 3,716,206 | 2/1973 | Lynch et al. | 244/1 SA |

*Primary Examiner*—Manuel A. Antonakas
*Assistant Examiner*—S. J. Richter
*Attorney, Agent, or Firm*—T. W. Kennedy

[57] ABSTRACT

A single degree of freedom floated gyro in which the floatation fluid is utilized to render the gyro immune to output axis angular acceleration by directing fluid flow under such acceleration through paths of varying crosssectional area such that the fluid applies an inertia compensating torque to the gyro float.

9 Claims, 12 Drawing Figures

PATENTED MAY 27 1975  3,885,443

SHEET 1

FLOATED GYRO WITH ANGULAR INERTIA COMPENSATION

BACKGROUND OF THE INVENTION

The invention relates generally to the field of inertial sensing, and more particularly to the stabilization of floated gyros.

Single degree of freedom floated gyros are used to sense rotation of a vehicle about an input axis. The floated gyro with its housing or case can be mounted to the vehicle in two different ways. In the platform system, gimbals isolate the gyro from angular rates and angular accelerations of the vehicle. In the strap down system, on the other hand, angular rates and accelerations of the vehicle are experienced directly because the gyro case is rigidly mounted on the vehicle. As a result, there are error sources unique to strap down systems, and one of the major error sources is that due to angular acceleration, both vibrational and steady state, about the gyro's output axis. Due to the inertia of the gyro float, output axis angular acceleration causes an undesirable torque relative to the gyro case which must be segregated from that caused by gryroscopic torque or precession due to the input axis angular rate the gyro is attempting to measure.

SUMMARY OF THE INVENTION

The general purpose of the invention is to make the floated gyro immune to output axis angular accelerations. Another object of the invention is to accomplish such immunity by means of an internal compensation mechanism.

Toward the fulfillment of these and other objects a single degree of freedom floated gyro is made immune to output axis angular accelerations by directing the floatation fluid through ducts of varying cross-section formed in the gyro case about the output axis such that the fluid applies an inertia compensating torque to the gyro float.

In one embodiment the gyro float is equipped with a pair of opposite longitudinal vanes extending radially into longitudinal recesses formed in the gyro case. Ports are formed in the recesses to one side of the plane of the vanes communicating with a large cross-sectional area, semi-circular duct formed concentrically in the case. An opposite, small cross-sectional area, semicircular flow path is defined between the spaced cylindrical surfaces of the float and the case. The two flow paths are connected via the aforementioned ports providing a closed path through which the floatation fluid can circulate under the influence of output axis angular acceleration of the gyro case in a strap down system. The varying characteristics of the closed fluid path causes a pressure differential to be experienced by corresponding sides of the vanes on the gyro float. The parameters of the closed flow path are determined such that float inertia effects are compensated for by fluid inertia effects. To provide double-acting flow paths, a similar parallel, closed flow path can be built into the gyro case to apply a pressure differential to the other sides of the gyro vanes.

In another embodiment, a cylindrical gyro float without vanes is floated in a case having a pair of opposed rib-like projections extending radially inward toward the surface of the gyro float to divide the floatation fluid volume into two sections. Each section has a pair of opposite ports interconnecting the small cross-sectional area path defined by the gap between the float and the case with a semicircular duct of larger cross-sectional area to provide double-acting flow paths. Differential pressures are applied to the surface of the float in the form of shear forces. Again, the parameters of the double-acting flow paths are determined so that the effect of fluid inertia counterbalances the float inertia.

The large cross-sectional area flow paths in each of the foregoing embodiments can be increased in length by means of helical ducts formed in the case making an odd number of half turns around the output axis. For double-acting flow paths, double helix formation is used for the large cross-sectional area ducts.

DESCRIPTION OF THE PREFERRED EMBODIMENT

Figure 1:
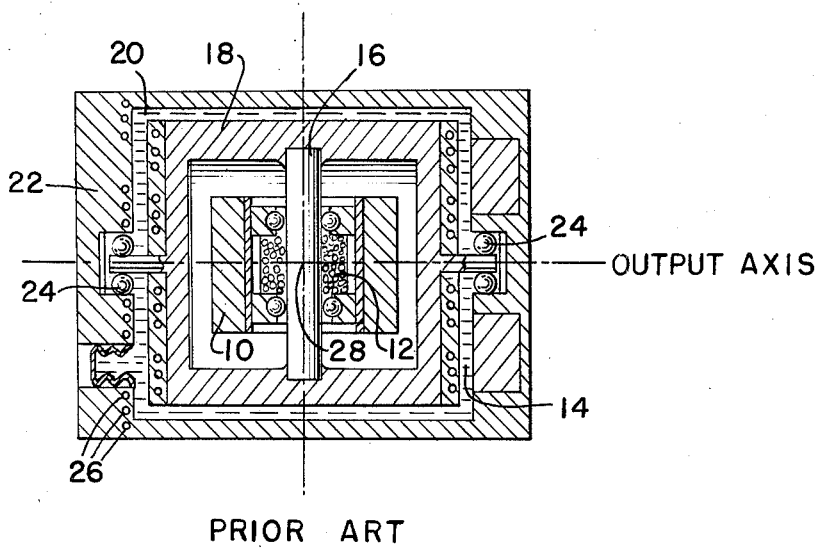
FIG. 1 is a sectional side view of a conventional single axis floated gyro.

To review briefly the principles of single degree of freedom floated gyro construction, FIG. 1 illustrates a conventional floated gyro design in which a gyro rotor 10, driven by a hysteresis synchronous motor with windings 12 and a motor hysteresis ring 14, is mounted for high speed continuous rotation about a spin axis by means of ball bearings on a rotor shaft 16. The ends of the shaft 16 are supported within a gas-filled cylinder 18, called the "float," which encases the rotor 10. The float 18 is immersed in floatation fluid 20 within a hollow, fluid-tight cylindrical case 22. The float 18 is mounted for rotation within the case 22 about an output axis perpendicular to the spin axis by means of bearings 24. Electrical windings 26 in the float 18 and case 22 provide pick-off and torquer coils. In the conventional gyro, the floatation fluid 20 which fills the space between the float 18 and case 22 provides damping for rotation of the float 18 relative to the case 22 and holds the float 18 in neutral buoyancy to protect the bearings 24. The input axis 28 perpendicularly intersects the spin and output axes of the gyro assembly and is thus perpendicular to the paper in FIG. 1. The floated gyro is designed to measure rotation of the case 22 about the input axis 28. Torque applied perpendicularly to the spin axis results in rotation of the float relative to the case about the output axis. This relative rotation is detected and measured by means of the pick-off windings 26. In the conventional gyro, an angular acceleration of the case 22 about the output axis also causes relative rotation between the case 22 and the float 18 because of the inertia of the float 18 and its contents.

The present invention is directed to a system utilizing the floatation fluid 20 to compensate for the inertia of the float 18 in order to render the gyro insensitive to angular acceleration about the output axis without affecting its response to input axis angular rates.

Figure 2:
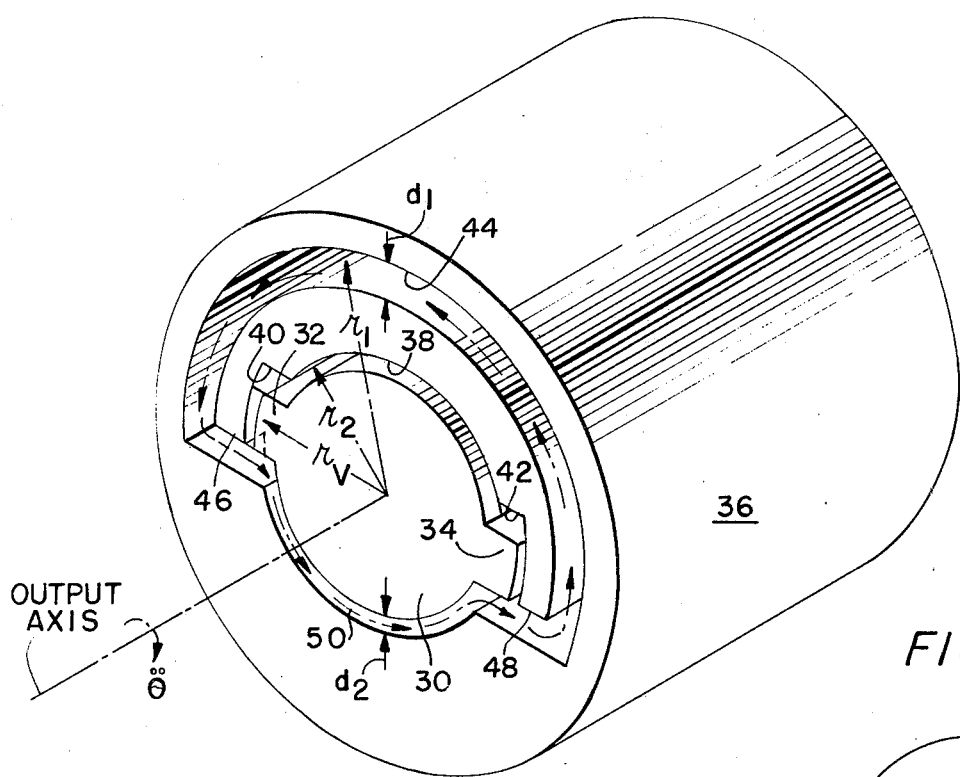
FIG. 2 is a sectional view in perspective illustrating a float-inertia compensated gyro with vanes according to the invention.
Figure 3:
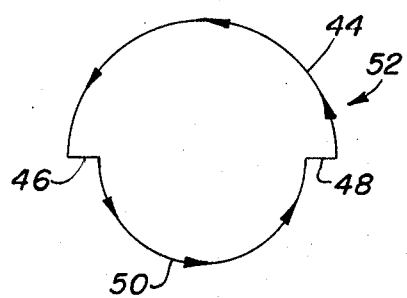
FIG. 3 is a schematic flow path diagram for the compensation system of FIG. 2.

In FIG. 2 a specially designed float 30 has a cylindrical outer surface with opposite longitudinal vanes 32 and 34 extending radially outward. The vanes have an average radius, $r_v$. The float 30 is mounted for rotation (as in FIG. 1) within a special hollow case 36 filled with floatation fluid. The case 36 has a cylindrical inner surface 38 spaced radially from the outer cylindrical surface of the float 30 by a small gap. The inner cylindrical surface 38 of the case 36 is interrupted by corresponding opposite radial recesses 40 and 42 extending along the length of the float. The vanes 32 and 34 are received in the recesses 40 and 42 respectively with sufficient clearance to permit adequate rotation between the float 30 and case 36. A semicircular duct 44 is formed coaxially within the case 36. The average radial distance of the duct 44 from the output axis is $r_1$ and the height of the duct in the radial direction is $d_1$. Beneath the vanes 32 and 34, as viewed in FIG. 2, ports 46 and 48 are formed radially through the side walls of the recesses 40 and 42 respectively. Ports 46 and 48 communicate respectively with the ends of the semicircular duct 44 so that the duct 44 provides a flow path for the floatation fluid. Another flow path 50 with an average radius, $r_2$, opposite the duct 44, is defined between the ports 46 and 48 by the narrow gap of height $d_2$ between the float 30 and the interior surface 38 of the case 34. A substantially closed flow path 52 (FIG. 3) is thus defined consisting serially of port 46, flow path 50, port 48 and semicircular duct 44.

By design the flow path 50 has a smaller cross-sectional area than that of the duct 44. Thus fluid circulating about the closed flow path 52 (FIG. 3) will experience a reduced cross-section when navigating the smaller flow path 50 alongside the float 30.

Clockwise angular acceleration, $\ddot{\theta}$, of the case 36 about the output axis results in counterclockwise flow of the floatation fluid, relative to the case, through the closed flow path 52 provided by the structure of FIG. 2. The flow path and direction of relative flow is indicated schematically in FIG. 3. When subjected to angular acceleration, the inertia or acceleration-resistance of the fluid in the closed path 52 of varying cross-section gives rise to a pressure differential or unbalance around the closed path. This unbalance in pressure is greatest between the ports 46 and 48. For counterclockwise flow, as in FIG. 3, the pressure, $P_A$, at the entrance (port 48) to the large cross-sectional area duct 44 is substantially less than the pressure, $P_B$, at the exit (port 46) from the duct 44.

Figure 4:
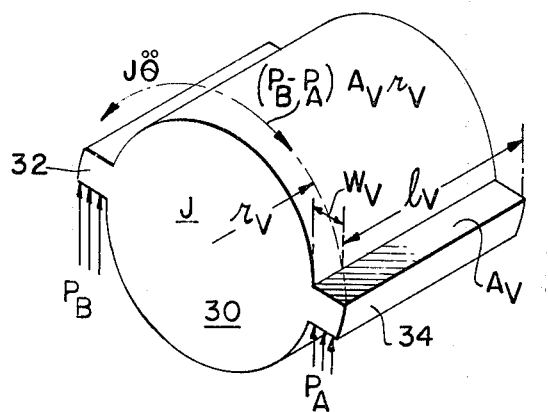
FIG. 4 is a schematic diagram illustrating a perspective view of the float in FIG. 2 in equilibrium.

Because the undersides of the vanes 32 and 34 actually form a portion of the wall defining the flow path through the ports 46 and 48, respectively, the fluid pressures at these ports are experienced directly by the vanes of the float 30, as represented in the free body diagram of the float 30 in FIG. 4. Fluid pressure $P_A$ is applied to the vane 34 over a working area $A_v$, the product of the length, $l_v$, and width, $w_v$, of the vane. Likewise, pressure $P_B$ is applied to the other vane 32 over an equal area. The pressures on the vanes 32 and 34 oppose each other because they are applied in opposite directions with respect to the output axis about which the float 30 is rotatable. Thus the resulting torque on the float 30 is $(P_B - P_A) A_v r_v$, where $r_v$ is the moment arm. This differential pressure torque opposes the inertial torque of the float, expressed as $J \ddot{\theta}$, where $J$ is the angular inertia of the float 30 and its contents about the output axis. Fluid shear effects on the float cause another torque adding with the inertial torque. Neglecting shear effects for the moment, it is evident that inertial torque may be cancelled or counterbalanced if the differential pressure torque is made equal to inertial torque:

$$J \ddot{\theta} = (P_B - P_A) A_v r_v.$$

(1)

The pressure differential for the flow path of FIG. 3A is approximated by:

$$P_B - P_A = \ddot{\theta} \overline{r}^2 \rho \pi,$$

(2)

where $\rho$ is the density of the fluid and $\overline{r} = r_1 = r_2$. Combining equations (1) and (2) and cancelling $\ddot{\theta}$, equation (1) becomes $$J = \overline{r}^3 \rho A_v \pi.$$

(3)

Thus, under these assumptions, float inertia effects are compensated for by fluid inertial effects if $\overline{r}^3 \rho A_v \pi$ is made to equal $J$ by proper determination of the variables.

Figure 5:
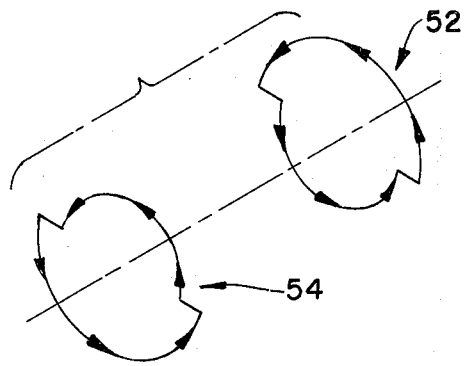
FIG. 5 is a schematic flow path diagram illustrating double-acting flow paths for the system of FIG. 2.
Figure 6:
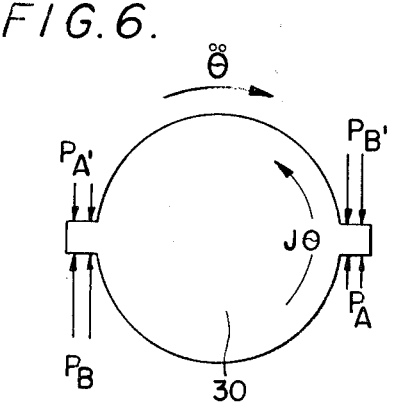
FIG. 6 is a schematic diagram illustrating the float of FIG. 2 with double-acting flow paths in equilibrium.

As diagramed in FIG. 5, another closed flow path 54 may be added to the structure of FIG. 2. The path 54 duplicates the closed flow path 52 but is inverted with respect to path 52. Another pair of ports, like ports 46 and 48, are formed through the side walls of the recesses 40 and 42 in the cylindrical inner surface of the case 36 in communication with another large cross-sectional area flow duct, like duct 44. The duplicate ports and large flow duct are spaced longitudinally from ports 46 and 48 and duct 44 as indicated in FIG. 5. In this case the duplicate ports apply a pressure differential $P_{A'} - P_{B'}$ to the top side of the vanes 32 and 34 as shown in FIG. 6. The pressure differential $P_{A'} - P_{B'}$ due to the duplicate closed flow path 54 adds with that due to the closed flow path 52 to provide "double-acting" flow paths with a consequent doubling of the pressure differential torque on the float 30.

Figure 8:
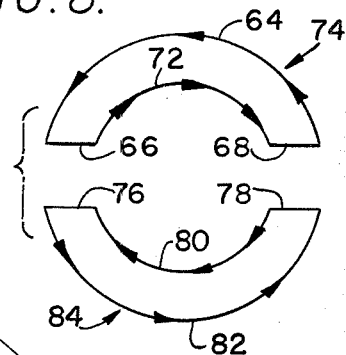
FIG. 8 is a schematic flow path diagram for the embodiment of FIG. 7.
Figure 7:
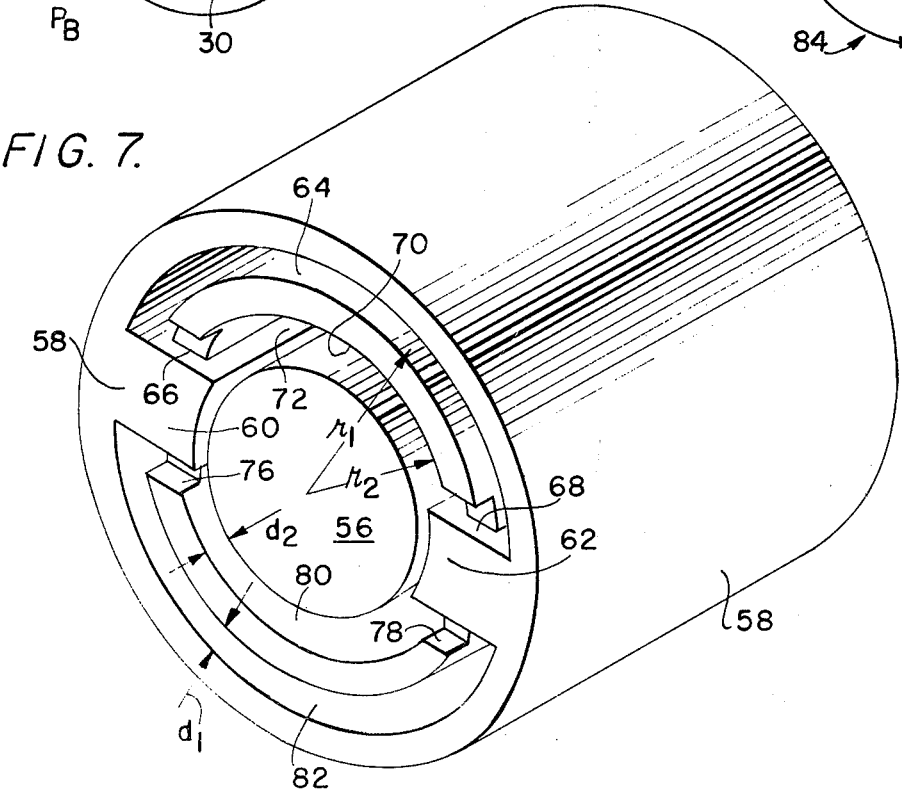
FIG. 7 is a sectional perspective view of another embodiment of the invention without vanes.

Another embodiment of the invention, shown in FIG. 7, permits the use of a simple, vaneless cylindrical float 56. The modified case 58 has a pair of opposed inner longitudinal rib-like sections 60 and 62 extending along the length of the float 56. The sections 60 and 62 fit the surface of the float 52 with a small clearance, thereby dividing the volume of floatation fluid into two equal portions (upper and lower as viewed in FIG. 7). In the upper fluid volume a semicircular duct 64 of height $d_1$ and average radius $r_1$ is coaxially formed in the case 58. Ports 66 and 68 are formed through the inner surface 70 of the case 58 at corresponding longitudinal locations where the inner surface 70 meets the rib-like sections 60 and 62. A smaller flow path 72 of cross-sectional area $d_2$ and radius $r_2$ is defined between the inner surface 70 of the case 58 and the outer surface of the float 56. The ports 66 and 68 permit fluid communication between the coaxial flow paths 64 and 72. Thus the port 66, flow path 72, port 68 and duct 64 comprise in series a closed flow path 74 about which the floatation fluid in the upper fluid volume can circulate. For the lower fluid volume similar ports 76 and 78 interconnect and an inner flow path 80 defined between the inner surface 70 of the case 58 and the outer surface of the float 56 with an outer concentric semicircular duct 82 formed in the case 54. Thus the closed fluid path 84 in the lower half of the case 58 duplicates that in the upper half. The resulting double-acting flow paths are diagramed in FIG. 8. Under clockwise angular acceleration of the case 58 in FIG. 7, fluid will flow, relative to the case, within each closed flow path 74 and 84 in essentially a counterclockwise direction (within each closed path) although the direction of flow with respect to the output axis is reversed for the smaller radius paths 72 and 80.

Figure 9:
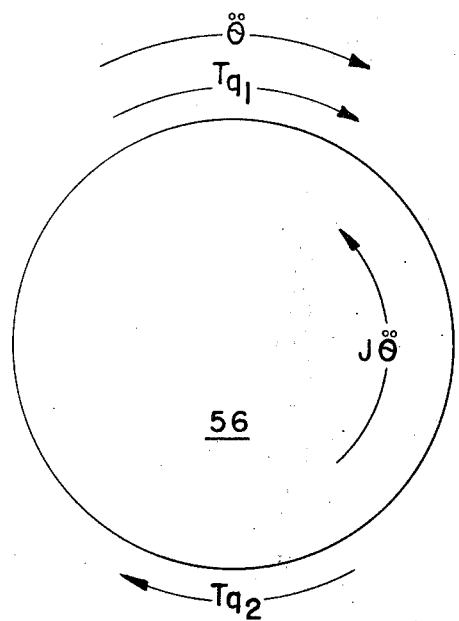
FIG. 9 is a schematic diagram of the float of FIG. 7 in equilibrium.

FIG. 9 illustrates the free body diagram for the system of FIG. 7. Compensation of the J $\ddot{\Theta}$ float inertia torque is accomplished by means of viscous or shear torques on the float surface due to flow through the double-acting flow paths. The flow torque, $T_q$, (distinguished from pressure differential torque, $T_v$, for the vaned embodiment) is proportional to $\ddot{\Theta}$. The flow torque is approximated by:

$$T_q = \ddot{\Theta}\, r_2 r_1^2 \rho d_2 w\, \pi$$

(4)

where $w$ is the length of the float. Since the flow torque opposes float inertia torque, if $T_q = J \ddot{\Theta}$, float inertia torque is cancelled. By design, $r_2 r_1^2 \rho d_2 w\, \pi$ is made equal to J for compensation.

It should be noted that in both the vaned and vaneless design, the compensation is not dependent on fluid viscosity. Viscosity will, however, affect the response of the systems.

The fluid inertia effect may be magnified in practice by making the large cross-sectional area flow path (path 44 in FIG. 2 or paths 64 and 82 in FIG. 7) make several turns around the output axis. For example, equation (3) for the vaned embodiment would be modified as follows:

$$J = \bar{r}^3 \rho\, A_v N\, \pi$$

(5)

where N is the number of half-turns the flow path makes. N will always be an odd number.

Figure 10:
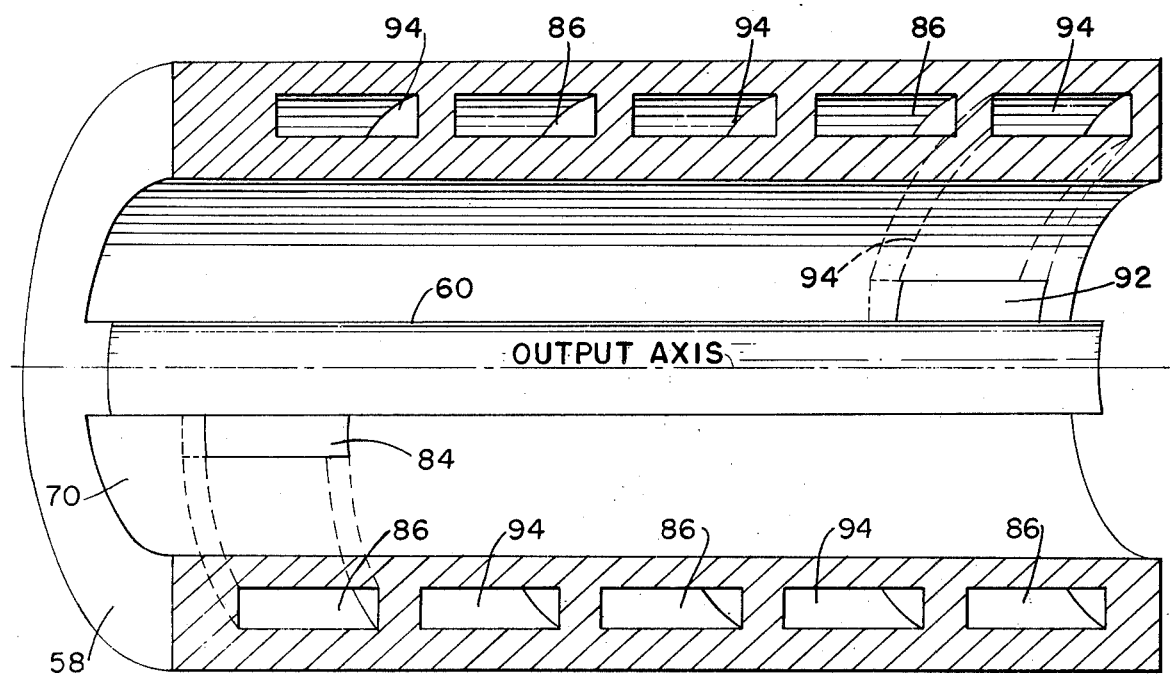
FIG. 10 is a fragmentary sectional view of the vaneless embodiment of FIG. 7 modified to incorporate double helical flow paths.
Figure 11:
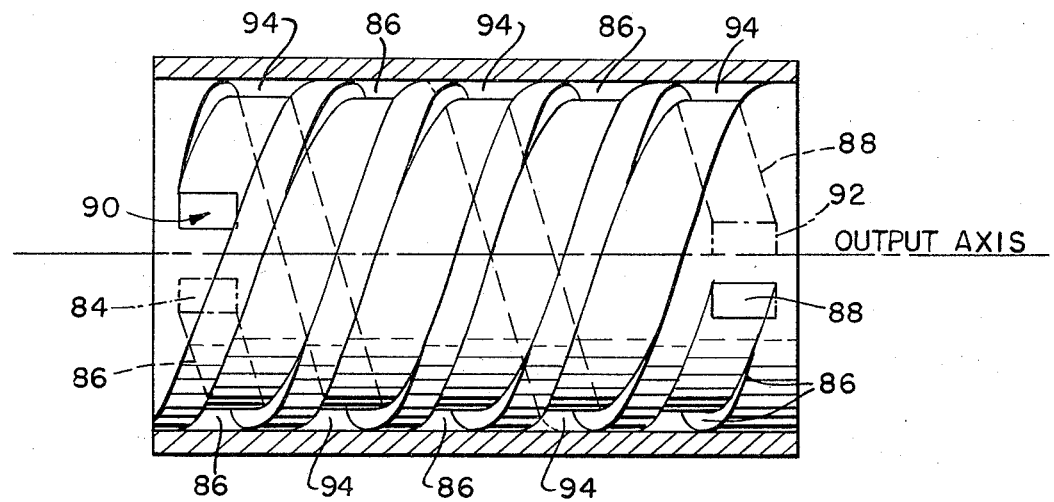
FIG. 11 is a side view of a gyro case with the outer shell thereof broken away to reveal the double helical flow paths.

An example of the application of this principle to the vaneless embodiment of FIG. 7 is shown in FIGS. 10 and 11 illustrating the gyro case construction without the float. In FIG. 10 a view of the interior of the modified case 58' shows the rib-like section 60 protruding inward from the inner surface 70 of the case. The port 84 located beneath the section 60 corresponds in function to port 76 in FIG. 7 and thus interconnects the small cross-sectional area flow path defined between the float and the case surface 70 with the larger cross-sectional area duct. However, in FIG. 10 the larger cross-sectional area duct makes five half-turns around the axis of the case (the output axis) instead of one as in the embodiment of FIG. 7. The multiple turns of the large cross-sectional area duct are accomplished by two and one-half cycles of a helical duct 86. The port 88 (FIG. 10) at the other end of the helical duct 86 is displaced longitudinally from the first port 84, unlike the system shown in FIG. 7 where the ports can be in the same plane as the large cross-sectional area duct. The flow path completed by the helical duct 86 and ports 84 and 88 for the lower half of the floatation fluid volume in FIG. 10 is complemented by a similar system for the upper half which includes a pair of longitudinally displaced ports 90 and 92 interconnecting the small cross-sectional area flow path defined between the float and the case with a second helical path 94. Like the helical duct 86, the other helical duct 94 completes two and one-half cycles between the ports 90 and 92. The two helical ducts 86 and 94 are interwound in the form of a double helix (FIG. 11).

Figure 12:
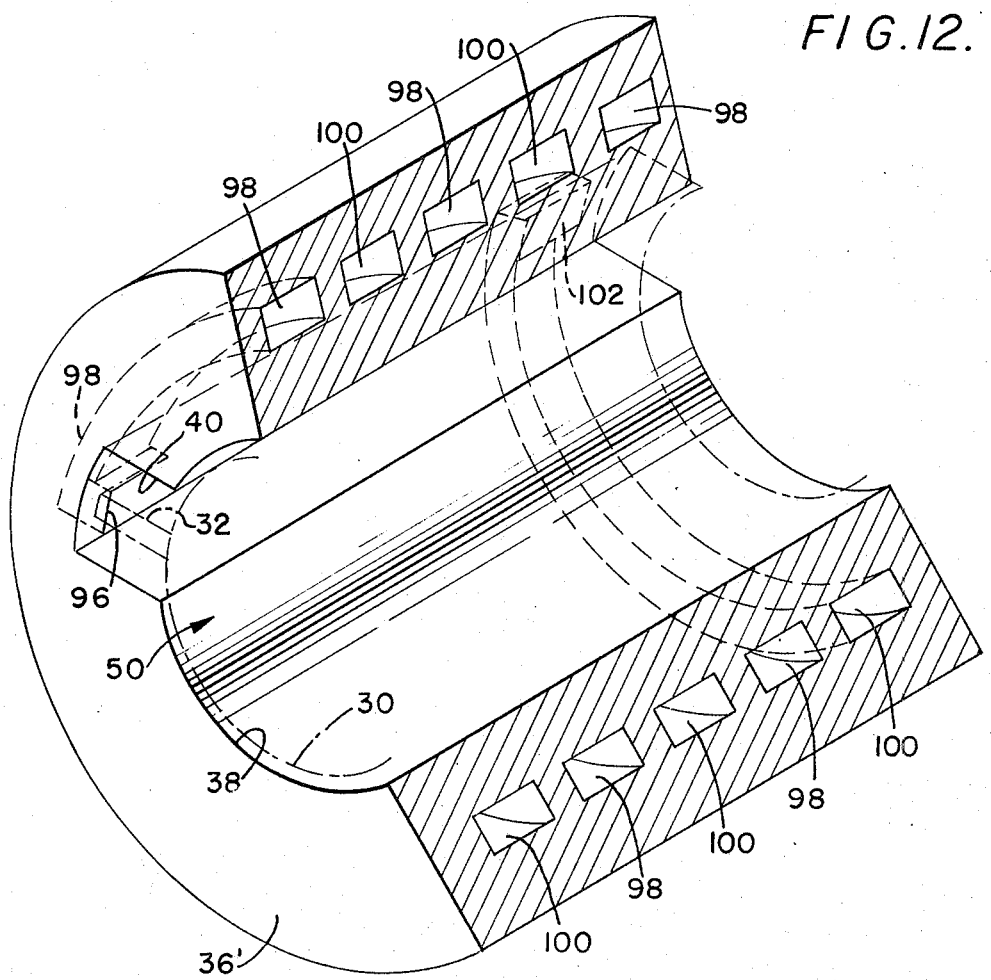
FIG. 12 is a fragmentary sectional view of the vaned embodiment of FIG. 2 modified to incorporate the double helical flow paths of FIG. 5.

A similar arrangement can be applied to the vaned embodiment of FIG. 2. FIG. 12 shows a longitudinal section of the modified gyro case 36'. One of the vanes 32 of the float 30 (shown in phantom) is illustrated extending into the recess 40 formed in the case 36'. A port 96 located in the side wall of the recess 40 beneath the vane 32 communicates with a large cross-sectional area helical duct 98 formed coaxially within the case 36'. The corresponding port at the other end of the helical duct 98 beneath the opposite vane 34 is not shown in FIG. 12. As in the embodiment of FIG. 2, the duct 98 is interconnected by means of the ports at either end of the duct, with the small cross-sectional area flow path 50 defined between the inner surface 38 of the case 36' and the float 30.

For double-acting flow paths on the vaned embodiment of FIG. 12, differential pressure is applied above the vanes 32 and 34 by means of a second helical duct 100 of large cross-sectional area. A port 102 above the vane 32 interconnects one end of the helical duct 100 with the upper small flow path defined between the float and the case. The port at the other end of the helical duct 100 is not shown in FIG. 12 but occupies a position corresponding to that of port 96 but above the opposite vane 34.

From fluid mechanics it can be shown that the flow torque, $T_q$, experienced by the float in either the vaned or vaneless embodiment is given by the expression:

$$T_q = \frac{6\phi_2 r_2^2 \mu q}{d_2^2}$$

(6)

Where $r_2$ is the average distance of the small cross-sectional area flow path from the output axis, $\mu$ represents viscosity, $d_2$ represents the height of the smaller flow path, $\phi_2$ represents in radians the number of half-turns (ordinarily one) of the small cross-sectional area flow path, and $q$ is the flow rate. For double-acting flow paths, the resulting flow torque will be two times the value of $T_q$. In the vaned design the flow torque will add to the float inertia torque, J $\ddot{\Theta}$. The torque due to the pressure differential on the vanes, $T_v$, for the vaned design is designed to overcome the sum of the float inertia torque and the flow torque. For the vaneless design, the flow torque is designed to cancel the float inertia torque.

The following expression describes the flow rate in the vaned embodiment:

$$q = \frac{\dot{\Theta}\rho}{12\mu} \left[ \frac{r_1^2 \phi_1 + r_2^2 \phi_2}{\frac{r_1 \phi_1}{w_1 d_1^3} + \frac{r_2 \phi_2}{w_2 d_2^3}} \right] \quad (7)$$

Where $\phi_1$ represents in radians the number of half-turns of the large cross-sectional area duct and $w_1$ and $w_2$ are the widths of the large and small flow paths respectively. For the vaneless case, the plus sign in the numerator of the bracketed term becomes negative due to flow reversal. The expression for $q$ is inserted in equation (6) to calculate flow torque.

For example, with the vaneless design and double-acting flow paths, the design criterion may be stated as follows:

$$J\ddot{\Theta} = 2T_q \quad (8)$$

From equation (6), $$J\ddot{\Theta} = 2\left[ \frac{6 \phi_2 r_2^2 \mu q}{d_2^2} \right] \quad (9)$$

After substituting equation (7) for $q$ and cancelling terms:

$$J = \frac{\phi_2 r_2^2 \rho}{d_2^2} \left[ \frac{r_1^2 \phi_1 - r_2^2 \phi_2}{\frac{r_1 \phi_1}{w_1 d_1^3} + \frac{r_2 \phi_2}{w_2 d_2^3}} \right] \quad (10)$$

For the following example conditions with the vaneless design:
$J = 150$ gm cm$^2$
$r_1 = 3$ cm
$r_2 = 2.5$ cm
$\phi_1 = 5\pi$ radians
$\phi_2 = \pi$ radians
$w_1 = 1$ cm
$w_2 = 5$ cm
$\rho = 1.8$ gm/cm$^3$, a satisfying combination for $d_1$ and $d_2$ is 0.32 and 0.081 cm respectively. There will actually be many satisfying combinations. A wrong combination will result in over or under compensation.

For the vaned design, compensation is accomplished by the differential pressure torque, $T_v$, on the vanes of the float, with flow torque acting against compensation. Thus the full equation for equilibrium in the vaned design with double-acting flow paths is as follows:

$$J\ddot{\Theta} = 2(T_v - T_q) \quad (11)$$

To illustrate the computation of parameters for the vaned design, the example conditions are:
$\phi_1 = \phi_2 = \pi$ radians
$w_1 = w_2 = 5$ cm
$d_1 = 0.4$ cm
$d_2 = 0.004$ cm The other conditions are the same as in the previous example for the vaneless design.

When these values are substituted into equations (6) and (7), it can be shown that the fluid inertia associated with the flow torque, $2T_q/\ddot{\Theta} = 43$ dyne cm/(rad/sec$^2$).

This value compared to the inertial torque $T/\ddot{\Theta} = J$ of 150 dyne cm/(rad/sec$^2$) reveals, for the example conditions, that the additive drag torque is 29 percent of the inertia torque. The total torque to be overcome by $2T_v$ is: $43 + 150 = 193$ dyne cm/(rad/sec$^2$).

The torque $T_v$ due to the pressure differential on the vane is given by the expression $(P_B - P_A) A_v r_v$. And the full expression for the pressure differential is:

$$P_B - P_A = \ddot{\Theta}\rho\, r^2 \phi_1 - 12 q\mu \frac{r_1 \phi_1}{w_1 d_1^3} \quad (12)$$

where the right-hand term represents the viscous pressure drop ignored in equation (2). When the example conditions are substituted into the expression for $T_v$, $2T_v/\ddot{\Theta} = 102\, A_v r_v$ dyne cm/(rad/sec$^2$). For perfect compensation then $102\, A_v r_v$ must equal 193, or $A_v r_v = 1.89$ cm$^3$. For typical conditions, $r_v = 2.75$ cm with a float length of 5 cm, the width, $w$, of the vane is determined by $w = 1.89/1_v r_v = 0.138$ cm.

The vaned design requires lower flow and hence lower pressure. As a result, multiplying the number of turns of the outer flow path of larger cross-section is ordinarily not necessary in the vaned design.

Leakage between either vane and the adjacent side wall of the recess for the vaned design aides the compensation mechanism. For the vaneless design leakage between the divided volumes of floatation fluid across either longitudinal rib-like section opposes the compensation mechanism. Leakage is a consideration in the vaneless design because of the higher pressure differentials involved.

Although the vaned design requires a more complicated structure for the float, it does have the advantages of faster response, shorter flow paths, less flow and less leakage. In comparison, the vaneless design while using a simple float structure has greater leakage, longer flow paths and higher flow with slower response.

In practice, variations in the angular inertia of individual floats and difficulties in producing flow paths to sufficient tolerances can be compensated for by making the vaned or vaneless design "tunable" or adjustable to some degree. For example, radially movable weights can be attached to the float itself to adjust the float inertia. An adjustable restriction can be incorporated within the larger cross-sectional area duct to change the viscous loss, and thus the differential pressure, to alter the torque $T_v$. In addition, a longitudinally movable sleeve within the case can adjust the float area on which the flow torque acts.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:

1. A single degree of freedom floated gyro compensation system, comprising a hollow gyro case having an output axis, a gyro float mounted within said case and rotatable about said output axis, floatation fluid filling the space between said case and said float, and duct means formed in said case about said output axis communicating with said floatation fluid for compensating for the inertia of the float with respect to the output axis by means of fluid inertia.

2. The system of claim 1, wherein said duct means includes a closed flow path of varying cross-sectional area to cause said floatation fluid to apply an inertia compensating torque to said float.

3. The system of claim 2, wherein said closed flow path includes means to cause said fluid to apply a flow torque to said float equal in magnitude and opposite in direction from the float inertia.

4. The system of claim 2, wherein said closed flow path includes means for creating a pressure differential between two predetermined locations along said closed path under angular acceleration of said case about said output axis, said float having means responsive to said pressure differential for receiving a float inertia compensating torque therefrom.

5. The system of claim 1, wherein said case includes means parallel to said output axis for dividing the volume of said floatation fluid into two sections, and said duct means includes two curved ducts corresponding to said sections formed within said case and coaxial therewith, port means at the ends of said ducts for communicating with said floatation fluid, in each section the space between the inner surface of said case and said float defining a flow path coaxial to said output axis, the cross-sectional area of said ducts being greater than that of said flow paths, the corresponding ducts, ports and flow paths in said sections forming double-acting closed flow paths.

6. The system of claim 5, wherein both of said ducts make an odd number of turns greater than one around the output axis in the form of a double helix.

7. The system of claim 1, wherein said case has a pair of opposite longitudinal recesses formed along the length of its inner surface, said float having a pair of opposite vane-like members along its outer surface extending into said recesses of said case, and said duct means includes a semicircular duct formed in said case about said output axis, a pair of port means formed through the side walls of said recesses respectively to one side of the plane in which said vanes lie communicating respectively with opposite ends of said duct, a flow path of smaller cross-sectional area than said duct being defined about said axis opposite from said duct by the space between said float and the inner surface of said case, said duct, ports and flow path forming a closed flow path of varying cross-sectional area.

8. The system of claim 7, wherein said duct means includes another semicircular duct formed in said case about said output axis longitudinally spaced from said one duct and opposite thereto with respect to the plane on which said vanes lie, and another pair of ports formed through the side walls of said recesses respectively on the other side of said plane communicating with opposite ends of said other duct, whereby double-acting closed flow paths are defined about said output axis.

9. The system of claim 8, wherein the parameters of said ducts, the area of said vanes and the spacing between said float and inner surface of said case are determined such that the differential pressure acting upon said vanes counterbalances the sum of the flow torque and the float inertia torque on said float under angular acceleration about said output axis.

* * * * *